(12) United States Patent
Asada et al.

(10) Patent No.: US 11,491,645 B2
(45) Date of Patent: Nov. 8, 2022

(54) SCISSOR LINKAGE DESIGN AND METHOD OF OPERATION

(71) Applicant: Massachusetts Institute of Technology, Cambridge, MA (US)

(72) Inventors: Haruhiko Harry Asada, Lincoln, MA (US); Seiichi Teshigawara, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 16/672,292

(22) Filed: Nov. 1, 2019

(65) Prior Publication Data
US 2020/0384637 A1 Dec. 10, 2020

Related U.S. Application Data

(60) Provisional application No. 62/858,941, filed on Jun. 7, 2019.

(51) Int. Cl.
*B25J 9/10* (2006.01)
*B25J 9/12* (2006.01)
*B25J 18/02* (2006.01)

(52) U.S. Cl.
CPC ............ *B25J 9/1065* (2013.01); *B25J 9/126* (2013.01); *B25J 18/02* (2013.01)

(58) Field of Classification Search
CPC ... B25J 1/06; B25J 18/02; B25J 18/025; B25J 18/04; B25J 18/06; B25J 9/0075;
(Continued)

(56) References Cited

U.S. PATENT DOCUMENTS 2,363,784 A * 11/1944 Gerich .................. B66F 7/0608
212/295
2,533,980 A * 12/1950 Weaver ..................... B66F 7/08
254/9 B
(Continued)

FOREIGN PATENT DOCUMENTS

CN 107433618 A * 12/2017
DE 102011121207 A1 * 6/2013 ................ B66F 7/08
WO WO 2010/020050 A1 2/2010

OTHER PUBLICATIONS

DE 102011121207 A1 (Axel Ritter) 2013-06-20. [online] [retrieved on 2021-12-07], Retrieved from: ProQuest Dialog. (Year: 2013).*
(Continued)

*Primary Examiner* — Joseph Brown
(74) *Attorney, Agent, or Firm* — Wolf, Greenfield & Sacks, P.C.

(57) ABSTRACT

In one embodiment, a robotic limb includes a scissor linkage. In one embodiment, the scissor linkage includes a rotatable connection, two proximal links, and two motors configured to selectively rotate the two proximal links. Relative rotation between the two proximal links selectively controls extension, retraction, and rotation of the scissor linkage. Additional embodiments are related to scissor linkages including links designed to be have specific length relationships to avoid a singularity occurring during operation. In some embodiments, links may include torque transmissions to avoid singularities and/or to transmit torques to a distal portion of a scissor linkage for use in actuating other components including another scissor linkage arranged in series with first.

13 Claims, 9 Drawing Sheets

(58) Field of Classification Search
CPC ..... B25J 9/06; B25J 9/065; B25J 9/104; B25J 9/106; B25J 9/1065; B25J 9/107; B66F 7/0683; B66F 7/0691; B66F 7/0666; B66F 7/0675

See application file for complete search history.

(56) References Cited

U.S. PATENT DOCUMENTS

| | | | | |
|---|---|---|---|---|
| 2,861,700 | A * | 11/1958 | James | B25J 9/106 414/728 |
| 3,672,104 | A * | 6/1972 | Luckey | B66F 3/22 52/109 |
| 4,130,178 | A | 12/1978 | Smith | |
| 4,712,969 | A * | 12/1987 | Kimura | B25J 9/06 148/402 |
| 4,809,956 | A * | 3/1989 | Donze | F23D 14/465 266/48 |
| 4,891,492 | A * | 1/1990 | Nakanishi | B25J 9/104 219/125.1 |
| 5,394,959 | A | 3/1995 | Cullity et al. | |
| 5,746,138 | A * | 5/1998 | Hirose | B25J 9/106 108/143 |
| 8,672,297 | B2 | 3/2014 | Schmitt et al. | |
| 9,296,596 | B2 | 3/2016 | Cormack | |
| 2009/0088912 | A1* | 4/2009 | Rajaraman | B25J 9/106 701/19 |
| 2009/0266194 | A1* | 10/2009 | Zhang | B25J 9/042 74/490.01 |
| 2010/0196124 | A1 | 8/2010 | Fukuma et al. | |
| 2011/0238205 | A1 | 9/2011 | Kemp et al. | |
| 2014/0103277 | A1* | 4/2014 | Cormack | B66F 7/065 254/89 R |
| 2015/0300560 | A1* | 10/2015 | Matsuoka | A63H 33/00 362/427 |
| 2016/0003291 | A1* | 1/2016 | Honbo | F16C 11/04 248/277.1 |
| 2017/0050829 | A1 | 2/2017 | Taylor et al. | |
| 2018/0036879 | A1* | 2/2018 | Buibas | B25J 9/0036 |
| 2018/0043543 | A1* | 2/2018 | Buibas | B25J 18/02 |
| 2018/0241938 | A1* | 8/2018 | Buibas | B25J 9/1679 |
| 2019/0054637 | A1 | 2/2019 | Asada et al. | |
| 2019/0120346 | A1* | 4/2019 | Hongo | F16H 21/46 |
| 2019/0389080 | A1* | 12/2019 | Chundi | B25J 15/0273 |
| 2020/0238505 | A1* | 7/2020 | Parks, II | B25J 19/002 |

OTHER PUBLICATIONS

International Search Report and Written Opinion dated Feb. 25, 2020 for International Application No. PCT/US2019/059554.
PCT/US2019/059554, dated Feb. 25, 2020, International Search Report and Written Opinion.
PCT/US2019/059554, dated Jan. 2, 2020, Invitation to Pay Additional Fees.
Invitation to Pay Additional Fees dated Jan. 2, 2020 in International Application No. PCT/US2019/059554.

* cited by examiner

SCISSOR LINKAGE DESIGN AND METHOD OF OPERATION

CROSS-REFERENCE TO RELATED APPLICATIONS

This application claims the benefit under 35 U.S.C. § 119(e) of U.S. provisional application Ser. No. 62/858,941, filed Jun. 7, 2019, the disclosure of which is incorporated by reference in its entirety.

FIELD

Disclosed embodiments are related to scissor linkage designs and methods of operation.

BACKGROUND

Inspection and maintenance workers working inside large buildings, such as factories, hospitals, and schools, are frequently tasked to access narrow spaces. For example, older buildings often have many exposed pipelines and air ducts, especially on the ceilings of basements, and these structures often stretch in various directions in a complex manner. While workers may access these pipelines from below by using a ladder, such an approach may result in an accident, potentially leading to worker injury and ultimately decreased productivity.

Some difficult and/or complex maintenance tasks may be automated. An example of such an automated system is a quality inspection and assessment robot that can autonomously scan an entire room using cameras and laser scanners to pick up building defects, such as hollowness and cracking, as well as measure evenness, alignment, and inclination in addition to any other appropriate types of applications. This technology may be usable for inspection of floors, walls, ceilings, and other structures. Other solutions include drones and wall-climbing robots. These systems may easily access higher places, but may have a low payload capacity and may be unsafe for use inside buildings. Zipper type and chain type mechanisms possess high rigidity and a high rates of expansion. However, these extendable mechanisms may only extend directly upward. Therefore, it may be difficult to access confined areas within a complex structure. More complex scissor robots may realize a high payload capacity and multiple degrees of freedom. However, the accessible workspace for such a robot may be limited due to geometric design considerations associated with this type of structure.

SUMMARY

In one embodiment, a robotic limb includes at least one scissor linkage, a first motor, and a second motor. The least one scissor linkage includes a first proximal link and a second proximal link. The first motor is operatively coupled to the first proximal link to selectively rotate the first proximal link. The second motor is operatively coupled to the second proximal link to selectively rotate the second proximal link. Operating the first and second motors rotates the first and second proximal links. Relative rotation between the first proximal link and the second proximal link selectively controls extension, retraction, and rotation of the at least one scissor linkage.

In another embodiment, a method of controlling a robotic limb includes rotating a first proximal link of a first scissor linkage of the robotic limb and rotating a second proximal link of the first scissor linkage. Relative rotation between the first proximal link and the second proximal link selectively controls extension, retraction, and rotation of the first scissor linkage scissor linkage.

In another embodiment, a scissor linkage includes a plurality of serially connected scissor linkage segments. Each scissor linkage segment includes a proximal pivot joint, two opposing side pivot joints, a distal pivot joint, first link segments extending between the proximal pivot joint and the two side pivot joints, and second link segments extending between the two side pivot joints and the distal pivot joint. The second link segments are longer than the first link segments. The distal pivot joint forms the proximal pivot joint of an adjacent scissor linkage segment.

In another embodiment, a robotic limb includes a first scissor linkage. The first scissor linkage includes a first plurality links, wherein the first plurality of links are pivotably connected to each other in series, and a second plurality of links, wherein the second plurality of links are pivotably connected to each other in series. The first and second plurality of links are pivotably connected in a plurality of locations to form the first scissor linkage. The first plurality of links are constructed to transmit and apply a first torque to a pivot joint of an adjacent one of the first plurality of links to selectively extend and/or retract the first scissor linkage.

In another embodiment, a robotic limb includes a first scissor linkage. The first scissor linkage includes a first plurality links, wherein the first plurality of links are pivotably connected to each other in series, and a second plurality of links, wherein the second plurality of links are pivotably connected to each other in series. The first and second plurality of links are pivotably connected in a plurality of locations to form the first scissor linkage. The first plurality of links are constructed to transmit a first torque to an output located on a distal portion of the first scissor linkage.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
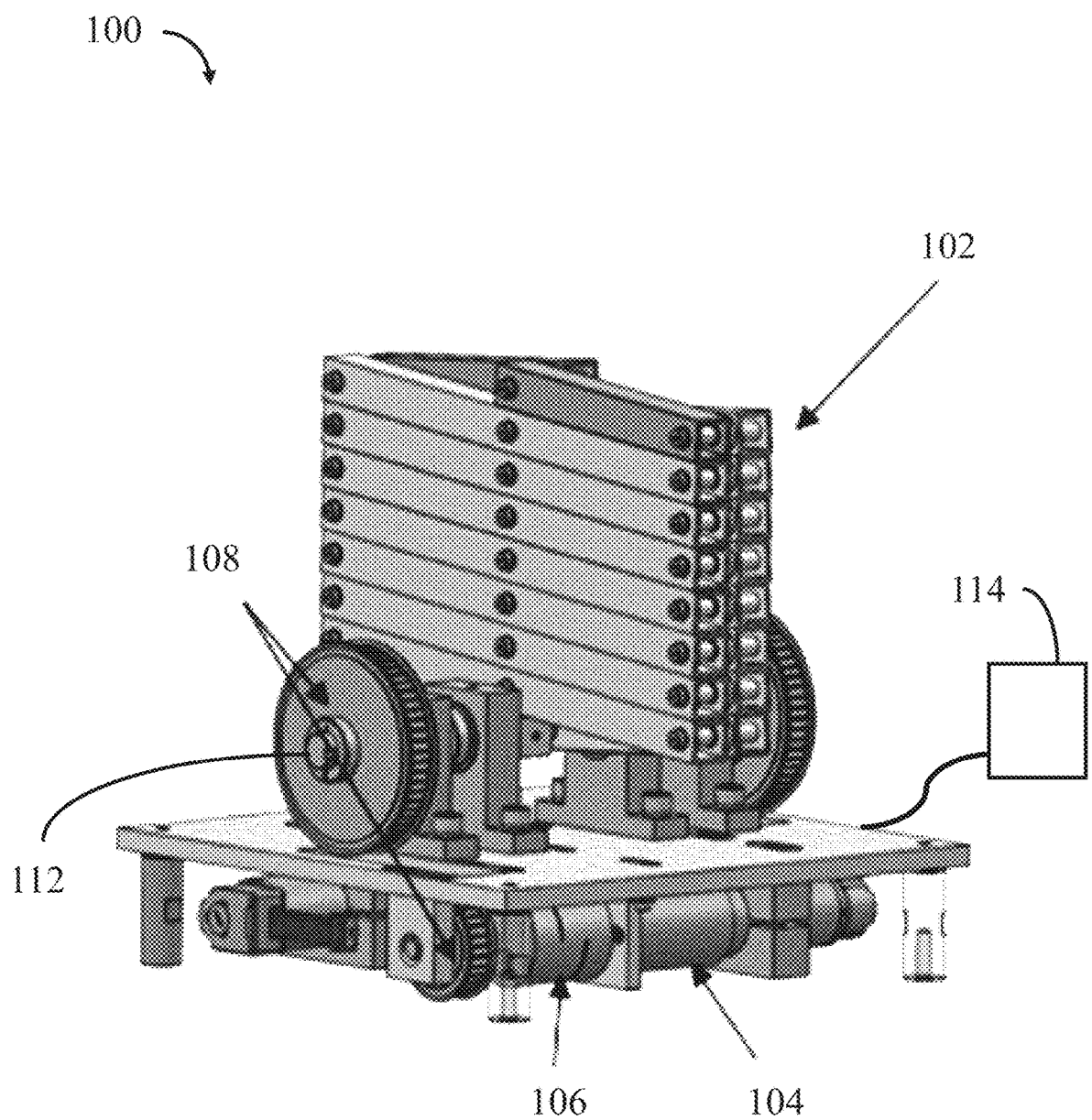
FIG. 1A is a schematic of one embodiment of a robotic limb.

As described above, a robot may be used in the inspection and maintenance of equipment inside buildings, such as exit signs, exposed pipelines, air vents, and fire alarms to reach high, hidden, or confined areas that may be difficult for humans to access. Automating such easily repeatable but potentially dangerous tasks may increase efficiency and limit possible injuries to maintenance workers. However, many conventional robots currently used in such applications suffer from limited degrees of freedom, lack of dexterity, and/or small payloads.

Scissor linkages may be appropriate in such applications due to their characteristically large expansion rate. Typically, conventional scissor linkages have been used as lifters that provide portability and accessibility. However, since a traditional scissor linkage may extend in a single direction perpendicular to its base, its work space capabilities and potential applications may be limited. Additionally, in some instances a traditional scissor linkage may experience a singularity position in which the linkage becomes "stuck", and the linkage may neither extend nor retract which may further limit the use of scissor linkages for certain applications.

In view of the above, the Inventors have recognized and appreciated the benefits associated with a two degree of freedom (2-DOF) scissor linkage in some embodiments. The scissor linkage may include one prismatic and one revolute degree of freedom, allowing the linkage to both extend/retract and rotate. Such a scissor linkage design may be beneficial in that it may achieve both a large expansion rate and a large flexible workspace compared to a traditional scissor linkage with only a single degree of freedom.

In view of the above, in some embodiments, a scissor linkage may include two actuators separately coupled to two proximally located base links of a scissor linkage. The proximal portions of the base links may be rotatably coupled to one or more rotatable connections on any appropriate base. Further, depending on the specific construction, the rotatable connection may be a direct connection to an output shaft of an associated actuator and/or a transmission may be used to transfer motion from an actuator to an associated base link to rotate the link about a rotatable connection. Accordingly, it should be understood that the actuators may be used to drive the base links of the scissor linkage individually. The base links may rotate about a single rotational axis in some embodiments. However, instances in which the base links are not rotated about a single rotational axis are also contemplated. By controlling a direction and relative magnitude of rotation of the two base links, the scissor linkage may both selectively elongate and retract as well selectively rotate about the rotatable connection, yielding two separate degrees of freedom.

During operation, a number of different rotational movements may be applied to the base links of the above noted embodiment. For example, the base links may be rotated in the same or opposite directions and the applied rotational displacements may be equal or different in magnitude depending on the desired motion. If the two base links are rotated relative to each other with equal displacement magnitudes, either towards or away from each other with equal displacement magnitudes, the scissor linkage may extend or contract, as in a traditional scissor linkage without rotation. In contrast if the base links are rotated in the same direction as each other, and with equal displacement magnitudes, the scissor linkage may rotate about the rotatable connection without extension and/or contraction. In instances where different magnitude rotational displacements are applied to the base links either towards and/or away from one another, the overall system linkage may both selectively extend or contract as well as rotate about the rotatable connection at the same time. For instance, if the two links rotated away from each other by different magnitudes, they scissor linkage may contract while rotating. Correspondingly, when the two links are rotated towards each other by different magnitudes, the system linkage may extend while rotating.

The above driving method may have advantages related to the torque and extensional speed of a scissor linkage. For example, when the linkage rotates, the two motors may rotate the links in the same direction. Thus, the rotation torque of the linkage may be double the torque of a single motor. On the other hand, when the linkage only extends or retracts, the motors may drive the links at equal speeds in opposite directions. In this case, the relative rotation speed between the links may be double the speed of a single motor. However, instances in which the motors are controlled such that the linkage rotates and selectively expands/contracts at the same time are also contemplated, in which case operation between these two extremes would be expected. In either case, the disclosed scissor linkage may expand and contract while also providing the noted two degrees of freedom.

In some embodiments, multiple 2-DOF scissor linkages may be combined in series to form a robotic limb with even more degrees of freedom. For example, a 4-DOF robotic limb may include two 2-DOF scissor linkages arranged in series. The 4-DOF robotic limb may include a rotary degree of freedom at its base, a prismatic degree of freedom along the length of the first scissor linkage, a second rotary degree of freedom at the distal end of the first scissor linkage, and a second prismatic degree of freedom along the length of the second scissor linkage. In some embodiments, the first scissor linkage may be designed to be higher power and/or longer range, while the second scissor linkage may be designed to have a smaller power and/or shorter range in order to be able to access a confined area easily. As a 4-DOF robotic limb may move in a single plane, two degrees of freedom may be redundant. This redundancy may enable access to a target point from different approaches, allowing avoidance of obstacles such as pipelines. In some embodiments, more than two such scissor linkages may be connected in series. Accordingly, it should be understood that any number of scissor linkages as described herein may be arranged serially to yield a robotic limb with any suitable number of degrees of freedom.

As noted above, the Inventors have additionally appreciated that a scissor linkage may experience a singularity position in which the linkage becomes "stuck", and the linkage may neither extend nor retract. In conventional scissor linkages, each portion of a linkage on either side of a pivot joint may be the same length. In such cases, a singularity may be reached if the links retract to such a degree that the angle between links approaches 180°. That is, considering a single scissor linkage unit that includes two links pivotably coupled near their midpoints, if the two links rotate to a position in which corresponding link ends are collinear with their pivot joint (i.e., the joint angle is 180°), no movement of the link ends towards one another may change their relative angle, as such movement may be directed towards the pivot joint and thus unable to create a torque on the links about the joint. Furthermore, in physical systems, certain non-idealities of a system may result in a singularity even if the angle between links is less than 180°.

One source of a singularity in a scissor linkage may be from deformation of the links. For example, a load applied to a scissor linkage may cause the links of the scissor linkage to deflect. If the load is applied in a direction that deflects the links towards the base, the joint angle may approach 180°, even if a kinematic analysis suggests that the joint angle should be less than 180°. A second source of a singularity may be from clearance in the joints of the scissor linkage, also known as "slop". For example, if a joint includes ball bearings, an overall clearance may include radial internal clearance of the ball bearings, deformation of the ball bearings, tolerance between the ball bearings and the housings of the ball bearings, tolerance between the ball bearings and the shafts of the joints, and/or other appropriate clearance contributions. The magnitude of the above noted effect may depend in part on the size and number of links in a scissor linkage. For example, a scissor linkage with more links may be more sensitive to singularities than a scissor linkage with fewer links, as a singularity may depend in part on the cumulative joint clearance of all joints.

In view of the above, the Inventors have appreciated that the challenges related to singularities may be mitigated using one or more of the strategies detailed below.

In one embodiment, a singularity may be avoided by changing the relative length of segments of a link located on either side of a pivot joint within a given segment of a scissor linkage. Whereas a single scissor linkage "unit", as defined below, may include two links crossing in an X shape, a scissor linkage "segment" may, in some embodiments, consist of a top distal portion of one unit and the bottom proximal portion of the next distally located unit, forming a quadrilateral with four pivot points connected by four link segments. Such a refraining may be beneficial for performing mathematical analysis and modeling of singularities. If the joints within a given segment of a scissor linkage exhibit a certain amount of clearance, the relative link segment lengths within that scissor linkage segment may be adjusted to mitigate the effects associated with joint clearances which may result in a singularity. For instance, the length from a proximal pivot joint to two opposing side pivot joints may be a first length and the length from the two opposing side joints to a distal pivot joint of the link segment may be a second length that is longer than the first length. The distal pivot joint may form the proximal pivot joint of an adjacent scissor linkage segment and vice versa for an adjacent proximally located link segment. In some embodiments, this may be rephrased as a linkage that includes a plurality of link units formed by two intersecting links in the shape of an X including a rotatable pivot joint located at a middle portion of the links where they intersect. A length between the proximal pivot joints of the links to the middle pivot joint may be longer than a length between the middle pivot joint and the distal pivot joints of the links. Linkage units such as these may be arranged in series with the distal pivot joints connected of a proximally located linkage unit connected to the proximal pivot joints of the next distally located linkage unit to form a desired scissor linkage. Regardless of how this relationship is phrased, this length relationships of the linkages may help to mitigate singularities induced due to the joint clearances, deformation, and other sources.

In the above embodiment, any appropriate length difference between the segments of a link extending between the various pivot joints may be selected to avoid the occurrence of a singularity during use. It should be understood that this particular value may correspond to any appropriate range depending on the payload capacity, link weight, number of links, design tolerances, link stiffness, overall dimensions, and other appropriate design parameters associated with any given scissor linkage. However, in some embodiments, a difference in the noted lengths may be greater than or equal to the accumulated joint clearances (i.e. slop) located within a single linkage unit of a scissor linkage. In some embodiments, a difference in the link segment lengths may be greater than or equal to 0.01 mm, 0.1 mm, 0.5 mm, and/or any other appropriate dimension. The difference in the link segment lengths may also be less than or equal to 1 mm, 0.5 mm, 0.1 mm, and/or any other appropriate dimension. Combinations of the foregoing are contemplated including differences in link segment lengths that are between or equal to 0.01 mm and 1 mm. In some embodiments, a difference in link segment lengths may be expressed as a percentage of the shorter link segment. That is, in comparing two link segment lengths, a longer link segment may be longer than a shorter link segment by a difference that is expressed as a percentage of the length of the shorter link segment. A longer link segment may be greater than or equal to 0.1%, 1%, or 2% longer than a shorter link segment. A longer link segment may be less than or equal to 5%, 4%, or 2% longer than a shorter link segment. Of course, it should be understood that differences in link segment lengths both greater and less than those noted above are contemplated as the disclosure is not limited in this fashion.

In a second embodiment, a singularity may be avoided by using a torque transmission disposed inside of the links of a scissor linkage to transmit and apply torques to the connection points between serially connected links such that a desired torque may be applied directly to each pivot joint within the linkage connected by the transmission. This singularity-avoidance strategy may be used alone or in conjunction with the altered link segment length strategy described above. In contrast to the above, in a conventional scissor linkage, torques may be transmitted from one link to another through the linkage structure itself. The Inventors have recognized that a torque transmission such as a belt and pulley system, coupled gears, a chain and sprocket transmission, and/or any other appropriate transmission may be used to transmit and apply torques to each joint to actively open and close each joint rather than relying on the structure of the scissor linkage to transmit the desired torques. Thus, a torque transmission located within a first link of a first unit of a scissor linkage may apply a torque to a second, adjacent link of a second, adjacent unit of a scissor linkage, causing the second link to rotate relative to the first link. A torque transmission within the second link may be actuated as the second link rotates relative to the first link, which may in apply a torque to rotate a third link of a third adjacent unit of the scissor linkage. In this way, a scissor mechanism may selectively extend and retract using torques applied at each of the joints of the serially connected links, as opposed to relying on the structure formed by both paths of serially connected links to provide the desired torques. Thus, it should be understood that in scissor linkages including two or more sets of serially connected links, either one, two, or any other appropriate number of these sets of links may include torque transmissions to apply torques at the joints of the serially connected links to open the scissor linkage, such links may be referred to as "drive links".

In yet other embodiments, the Inventors have recognized that a distinct torque transmission disposed inside of the links of a scissor linkage that does not apply a drive torque to open or close the linkage may be used to transmit torques to a distal scissor linkage or other component located on a distal portion of a first scissor linkage. In such cases, torques may be transmitted through a set of serially connected links such that the torque is transmitted from an input of a first, proximal scissor linkage to the inputs of one or more distally located scissor linkages arranged in series with the first scissor linkage. In such cases, the individual links may not apply torques at their connected joints within the serially connected links of the first scissor linkage. Rather, the torques may be transmitted though the links, and the links may be allowed to pivot freely about their connections. Such links may be referred to as "transmission links".

In some embodiments, a scissor linkage may include both drive and transmission links as described above. For example, a robotic arm may include two scissor linkages arranged in series and/or a scissor linkage and a component located on a distal portion of the scissor linkage. One path of serially connected links within the proximal scissor linkage may include drive links in which a torque transmission within each link may be used to transmit torques to adjacent drive links. The transmitted torques in these drive links may be used to manipulate the joint angles between adjacent drive links to extend and/or retract the proximal scissor linkage. The second path of serially connected links within the proximal scissor linkage may include transmission links which may be configured to transmit torques to the base of the distal scissor linkage and/or another appropriate component located proximate to a distal portion of the first scissor linkage to which a torque may be applied.

In some embodiments, a robotic limb may be mounted on a mobile base. The mobile base may include a platform coupled to one or more wheels. In such an embodiment, the motors used to control the distal scissor linkage(s) may be mounted proximally. For example, in some embodiments, all of the motors of a system may be mounted on a platform of the mobile base, and the motors used to control a distal scissor linkage may be transmit torques through a proximal scissor linkage as noted above.

In some embodiments, a scissor linkage may include multiple links. A link may be any suitable shape, size, or material. For the purposes of this disclosure, a link may be any suitable structure that may be configured to pivot about one or more points. In some embodiments, a link may be an elongate body that has a length substantially greater than either its width or depth.

Connections between adjacent links may enable rotation or pivoting between links. In some embodiments, links may be connected with ball bearings, shafts, rods, flexures, or any suitable structure to enable relative rotational movement of adjacent links, as the disclosure is not limited in this regard.

In some embodiments, a scissor linkage may include multiple units. A single "unit" of a scissor linkage may include two links crossed in an X shape and pivotably coupled at their point of intersection. Moving corresponding ends of the two links towards one another may cause each link to rotate about the point of intersection, which may move the opposite ends of each link towards one another. In such a manner, a scissor linkage unit may decrease in width and increase in length. Multiple scissor linkage units may be connected serially, such that the distal ends of the links of one unit may be pivotably coupled to the proximal ends of the links of an adjacent unit. In this way, manipulation of a single scissor linkage unit may cause a full scissor linkage to extend or retract. It should be appreciated that a scissor linkage may include any suitable number of scissor linkage units, as the disclosure is not limited in this regard.

In some embodiments, the ends of a scissor linkage may be differently configured than the intermediate scissor linkage units. Whereas the intermediate units may be described as being in an X shape, as discussed above, one or more of the ends of a scissor linkage may include, in some embodiments, end units that include two links arranged in a V shape. An end unit may include two links that may cross at a point substantially near their ends as opposed to substantially near their midpoints. The links of an end unit may be any appropriate length. In some embodiments, the length of the links in an end unit may be approximately half of the length of the links in an intermediate unit. In such embodiments, an end unit may be considered to be half of an intermediate unit. In some embodiments, an end unit may be manipulated by directly controlling the relative angle between the two links. An end unit on a proximal end of a scissor linkage may be described as a base unit, and the links of such a base unit may be described as base links. However, embodiments in which a scissor linkage does not include end units with links that are less than a length of the other links of the linkage are also contemplated as the disclosure is not limited to only the above noted implementation.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
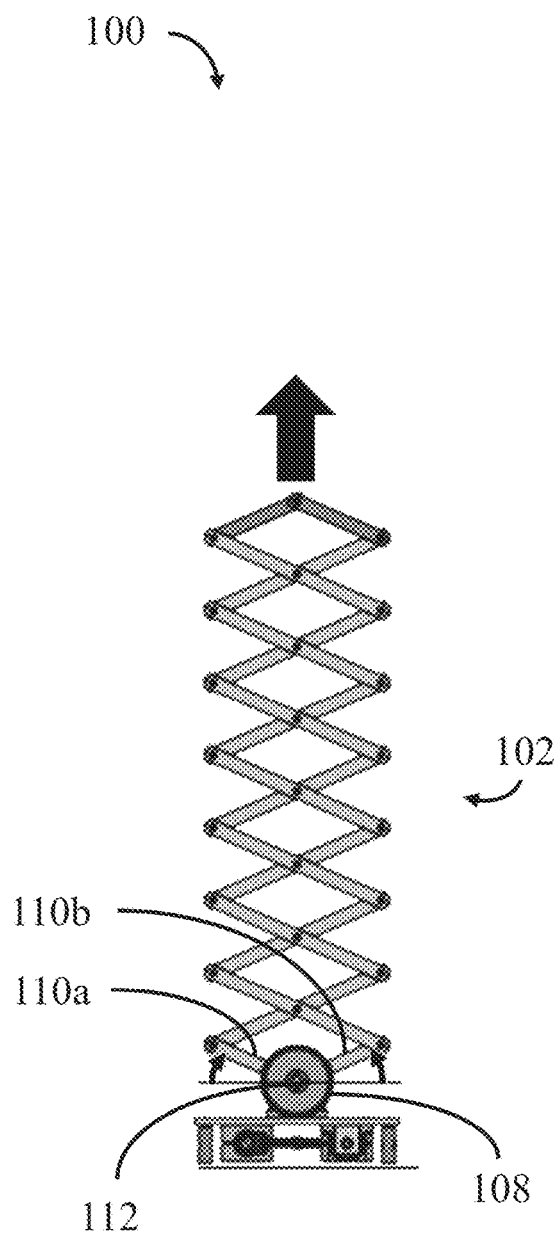
FIG. 1B depicts the robotic limb of FIG. 1A extending.
Figure 1C:
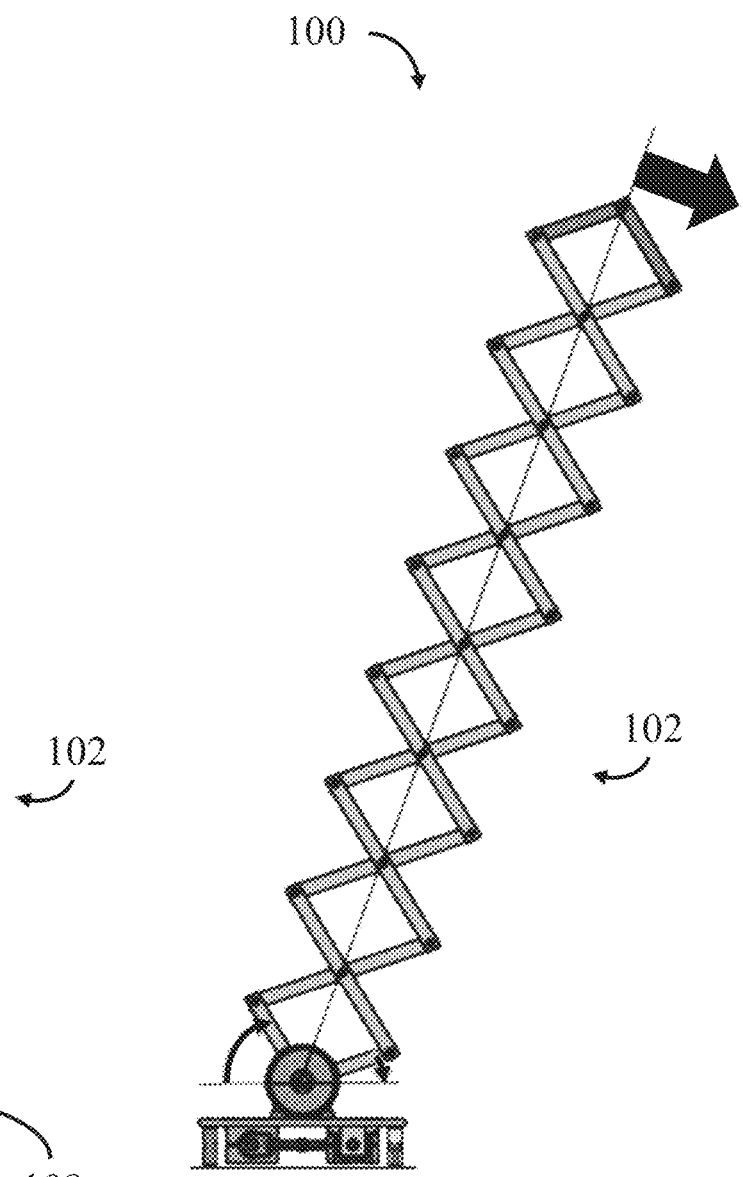
FIG. 1C depicts the robotic limb of FIG. 1A extending and rotating.

FIGS. 1A-IC depict one embodiment of a robotic limb 100. FIG. 1A is a schematic of the robotic limb 100. FIG. 1B depicts the robotic limb extending, while FIG. 1C depicts the robotic limb extending and rotating. The robotic limb 100 includes a scissor linkage 102. The scissor linkage includes a first proximal link 110a and a second proximal link 110b. The first and second proximal links are connected to a rotatable connection 112. Each of the proximal links 110a and 110b may extend outward from the rotatable connection towards a rotatable connection with an adjacent distally located link of the scissor linkage. Compared to the other links in the scissor linkage, the proximal links may be shorter than the other links in the scissor linkage. For example, the distance between a proximal axis of rotation of a proximal link and its connection to an adjacent link may be approximately half the length of other full links in the scissor linkage as shown in the figure. However, embodiments in which the proximal links are shorter or longer than this length are also contemplated.

In the embodiment of FIGS. 1A-1C, a first motor 104 is operatively coupled to the first proximal link 110a to selectively rotate the first proximal link relative to the rotatable connection 112. A second motor (not shown) is operatively coupled to the second proximal link 110b to selectively rotate the second proximal link relative to the rotatable connection 112.

In the embodiment shown in the figures, relative rotation between the first proximal link 110a and the second proximal link 110b selectively extends and retracts the scissor linkage 102. As shown in FIG. 1B, rotating the two proximal links towards one another at the same speed may cause the scissor linkage to extend. Conversely, rotating the two proximal links away from one another at the same speed may cause the scissor linkage to retract. Rotation of the first 110a and second 110b proximal links relative to the rotatable connection 112 may rotate the scissor linkage 102 about the rotatable connection. For example, rotating both proximal links clockwise at the same speed may rotate the scissor linkage clockwise. Conversely, rotating both proximal links counterclockwise at the same speed may rotate the scissor linkage counterclockwise. Rotating the two proximal links at the same speed in the same direction may cause the scissor linkage to purely rotate, while rotating the two proximal links at different speeds in the same direction may cause the scissor linkage to rotate as well as extend or contract simultaneously. For example, FIG. 1C shows both proximal links of the scissor linkage 102 being rotated clockwise. However, the first proximal link 110a is being rotated more quickly and/or by a different magnitude than the second proximal link 110b. Consequently, the scissor linkage 102 may both extend and rotate. Of course, the two proximal links may also be rotated at different speeds and in different directions, which may cause the scissor linkage to rotate and extend, or rotate and contract. Rather than considering the relative speed of the two proximal links, the extension, retraction, and/or rotation of the scissor linkage may be analyzed through the angular positions and displacements of the proximal links rather than speed. For example, if the angular positions of the two proximal links are altered such that the two proximal links are rotated towards one another using equal displacements, the scissor linkage may extend. Correspondingly, if the links are rotated away from one another by equal displacements the scissor linkage may retract. With regards to rotation, when the proximal links are moved in the same direction with equal magnitude displacements the scissor linkage may rotate. When intermediate states are obtained where unequal magnitude rotational displacements are applied to the proximal links, the scissor linkage may exhibit a combination of rotation with extension or retraction of the scissor linkage depending on the specific directions and magnitudes of the displacements.

In some embodiments, one or more proximal links may be directly connected to an output shaft of a motor. In such embodiments, a rotatable connection may simply be an output shaft of the motor connected to a portion of an associated link. In some embodiments, each proximal links may be associated with its own motor. For example, a first proximal link may be coupled to first motor, and a second proximal link may be coupled to a second motor. In this way, the position and velocity of each proximal link may be controlled independently as described above. In some embodiments, a transmission may be included between a motor and a proximal link. For example, as shown in FIG. 1A, a motor 104 may be connected to a coupling 106 which is connected to a rotatable connection 112 of a proximal link via an appropriate transmission such as the depicted pulleys 108. A transmission may include any number of belts, pulleys, gears, linkages, shafts, or any another suitable components configured to transmit an output of a motor to a proximal link. For example, as shown in FIG. 1A, pulleys 108 may be used to transmit the two separate rotational outputs of the two separate motors 104 to the two separate proximal links of the scissor linkage through the coupling and set of pulleys connected to the associated rotatable connection to the associated proximal link. In such an embodiment, the rotatable connection of the scissor linkage may be a shaft that applies the output torque and rotational motion from the motor to the associated proximal link. Of course, while a particular construction is shown, it should be understood that other transmission arrangements for transferring torques and motions to the links are contemplated including, for example, other transmission components such as chains, sprockets, gears, direct connections, and/or any other suitable mechanism for transmitting rotation to the desired links from the associated motors.

While the above description has referred to motors, it should be appreciated that any appropriate actuator capable of applying a desired rotational displacement and/or torque to a link either directly, or indirectly through a transmission, may be used to manipulate a scissor linkage in a robotic limb described in any of the embodiments disclosed herein. In some embodiments, rotary actuators such as DC motors, stepper motors, or servomotors may be used. In some embodiments, linear actuators such as pistons, solenoids, leadscrews, or hydraulic cylinders may be used. For example, a reciprocating linear actuator may be used with a linkage mechanism to produce a rotary motion that controls link angle. Of course, linkages may be used with rotary actuators as well. Actuators may be electric, hydraulic, pneumatic, or any other suitable type of actuator. Further, it should be appreciated that this disclosure is not limited with respect to the actuator(s) used to manipulate links of a scissor linkage.

In some embodiments, motors used to drive the proximal links of a scissor linkage may include sensors to provide feedback. For example, the motors may include encoders configured to track a rotational position of the motors, which may then be used as a parameter in controlling the scissor linkage. Of course, an encoder may also be used to extract velocity or acceleration data as well. A robotic limb that includes a scissor linkage may include additional sensors not necessarily associated with a motor. For example, joint angles between links may be sensed, or the load applied to the scissor linkage may be sensed. Appropriate sensors may include encoders, strain gauges, load cells, accelerometers, gyroscopes, hall effect sensors, photodiodes, inertial monitoring units, or any other suitable sensors configured to sense a parameter relevant to the operation of a robotic limb that includes one or more scissor linkages.

In some embodiments, a robotic limb may include a controller. For example, in the embodiment of FIGS. 1A-1C, a controller 114 may be operatively coupled to the one or more motors 104 of a robotic limb. The controller may include may include one or more processors and associated memory, such as a non-transitory computer-readable medium, storing processor executable instructions that when executed by the processor control the various associated components in the manner described herein. For example, a signal from an encoder, or other sensor, may be transmitted to and processed by the controller to determine an appropriate motor command. For instance, the motor may control an absolute command angle for a proximal link, a voltage and/or current applied to the motor to reposition a proximal link of a scissor linkage, and/or any other appropriate control parameter. A controller may be operatively coupled to any suitable number of actuators, sensors, or other components of a robotic limb, as the disclosure is not limited in this regard.

Figure 2A:
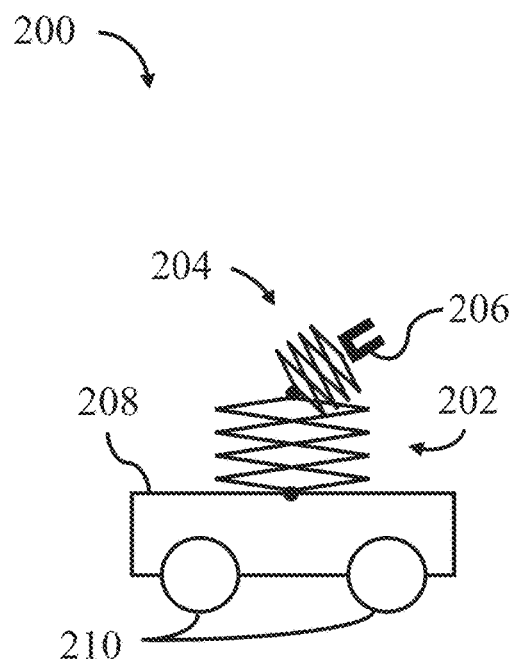
FIG. 2A is a schematic of one embodiment of a four degree of freedom robotic limb mounted on a mobile base in a retracted state.
Figure 2B:
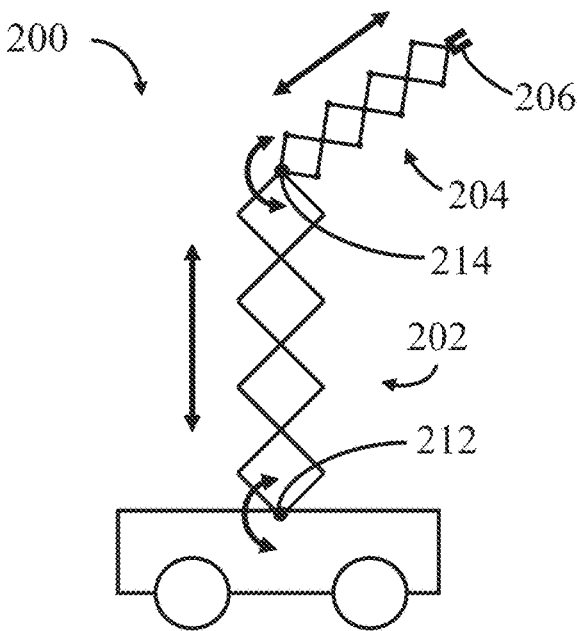
FIG. 2B depicts the robotic limb of FIG. 2A in an extended state.
Figure 2C:
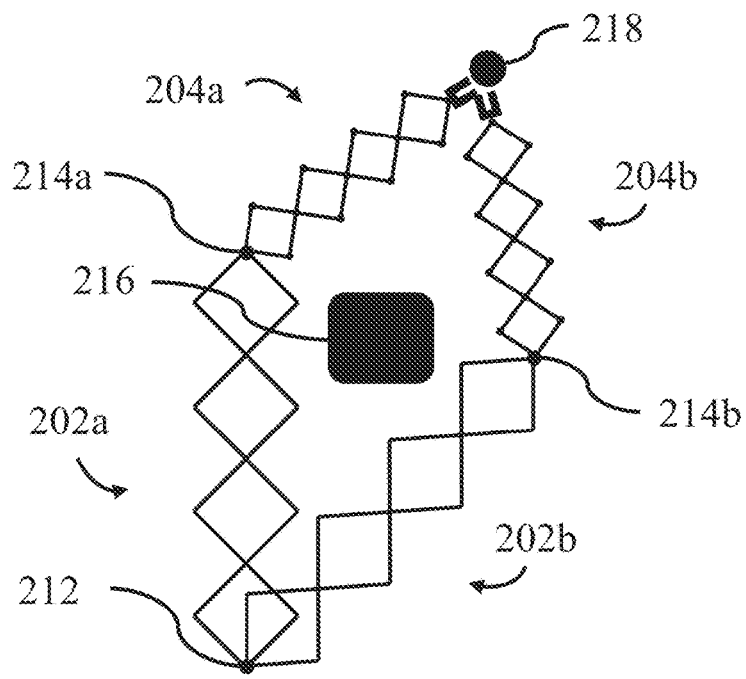
FIG. 2C is a schematic showing the redundancy of a four degree of freedom robotic limb reaching a target in a planar workspace using two different configurations.

FIGS. 2A-2C depict a 4-DOF robotic limb composed of two scissor linkages arranged in series. FIG. 2A is a schematic of a 4-DOF robotic limb mounted on a mobile base in a retracted state, while FIG. 2B shows the robotic limb in an extended state. In the embodiment of FIGS. 2A and 2B, a mobile robot 200 may include a first scissor linkage 202 operatively coupled to a second scissor linkage 204, forming a robotic limb. The distal end of the robotic limb may include an end effector 206, such as a robotic gripper or a sensor package. The robotic limb may be coupled to the mobile base 208 which may include one or more wheels 210. The first scissor linkage 202 may include a first rotatable connection 212 mounted on the base such that the first scissor linkage extends out from the base. The second scissor linkage 204 may include a second rotatable connection 214 mounted to a distal portion of the first scissor linkage such that the second scissor linkage extends out from the first scissor linkage. Thus, selective extension/retraction and/or rotation of the first scissor linkage 202 may reposition a location of the second rotatable connection 214 relative to the base and selective extension/retraction and/or rotation of the second scissor linkage may reposition a location of a distal end of the second says linkage relative to the position of second rotatable connection to obtain a desired position and/or orientation.

FIG. 2C is a schematic showing the redundancy of a 4-DOF robotic limb reaching a target in a planar workspace. In a first configuration, a first scissor linkage 202a may extend substantially vertically with respect to a first rotatable connection 212 to avoid an obstacle 216. In the first configuration, a second scissor linkage 204a may extend horizontally and vertically with respect to a second rotatable connection 214a in order to reach a target 218. In a second configuration, a first scissor linkage 202b may extend horizontally and vertically with respect to a first rotatable connection 212 to avoid the obstacle 216. In the second configuration, a second scissor linkage 204b may extend substantially vertically with respect to a second rotatable connection 214b in order to reach the target 218. This illustrates the flexibility of a robotic limb formed using two or more serially arranged scissor linkages.

In view of the above, in some embodiments a robotic limb may include two or more serially arranged scissor linkages. The serially arranged linkages may either be substantially similar, or one or more of the scissor linkages may be designed differently as the disclosure is not limited in this fashion. For instance, a proximal scissor linkage may include larger links configured to support heavier loads, while a distal scissor linkage may include smaller links configured to more easily navigate confined areas. Of course, the actuators driving the various scissor linkages need not be identical, but rather may be sized according to their respective scissor linkages and expected loads.

Figure 3:
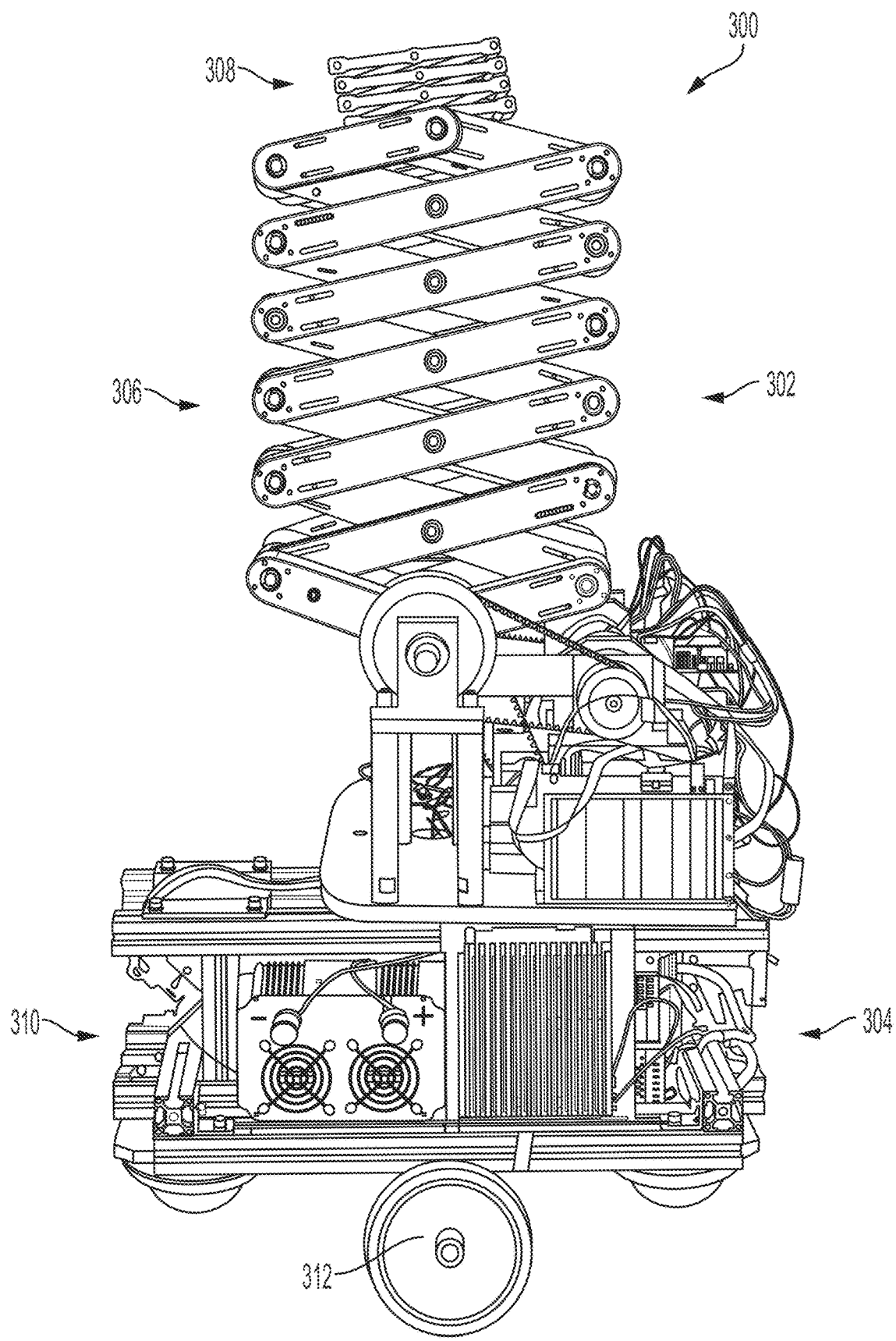
FIG. 3 depicts one embodiment of a mobile robot that includes a robotic limb mounted on a mobile base.

FIG. 3 depicts one embodiment of a mobile robot 300 that includes a robotic limb 302 mounted on a mobile base 304. The robotic limb 302 may include a first scissor linkage 306 and a second scissor linkage 308 arranged in series with the first scissor linkage and attached to a distal portion of the first scissor. The mobile base 304 may include a platform 310 and one or more wheels 312, and may be configured to position the base of the robotic limb in a desired position. As described above, each scissor linkage may include two actuators configured to rotate two proximal links of the scissor linkage to selectively control the extension and angle of the scissor linkage. In this particular embodiment, a robotic limb with two serial scissor linkages may include four motors. Two of the motors may be configured to control the proximal scissor linkage, and the other two motors may be configured to control the distal scissor linkage. The two motors configured to control the distal scissor linkage may be arranged adjacent the two motors configured to control the proximal scissor linkage. For example, in the embodiment of FIG. 3, all four motors may be mounted on platform 310 of mobile base 304. Though it should be understood that the motors for controlling the various portions of the depicted robotic arm may be mounted in any appropriate location as the disclosure is not limited in this fashion.

Figure 4A:
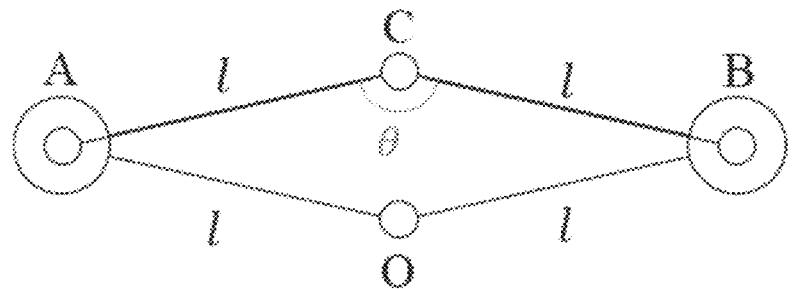
FIG. 4A depicts an idealized segment of a scissor linkage.
Figure 4B:
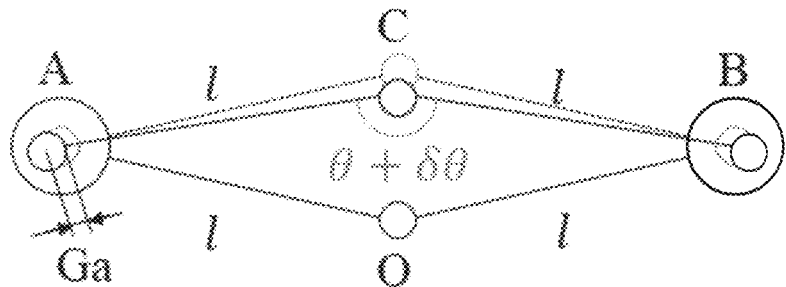
FIG. 4B depicts a segment of a scissor linkage with joint clearance.
Figure 4C:
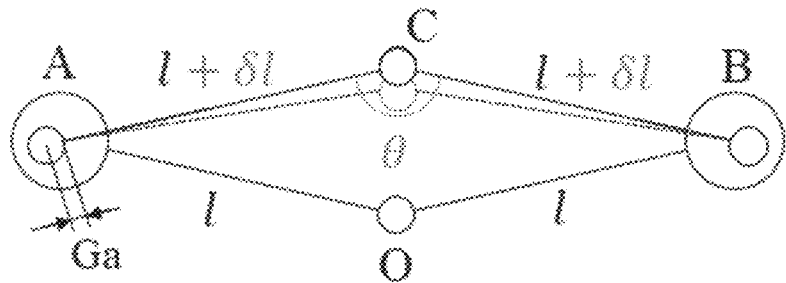
FIG. 4C depicts a segment of a scissor linkage with adjusted link segment lengths to account for joint clearance.

FIGS. 4A-4C depict a segment of a scissor linkage. A scissor linkage segment includes a proximal pivot joint O, side pivot joints A and B, and a distal pivot joint C. First link segments OA and OB of length l extend between the proximal pivot joint O and the separate opposing side pivot joints A and B. Second link segments AC and BC extend between the separate opposing side pivot joints A and B and the distal pivot joint C. The first link segments may be distal portions of full links extending between two side pivot joints of adjacent scissor linkage segments. Similarly, the second link segments may be proximal portions of full links extending between two side pivot joints of adjacent scissor linkage segments. As described above, a single "unit" of a scissor linkage may include two links crossed in an X shape and pivotably coupled at their point of intersection. A segment of a scissor linkage, such as the segment shown in FIGS. 4A-4C, may include a distal portion of a proximal unit (corresponding to first link segments OA and OB) coupled to the proximal portion of an adjacent, distal unit (corresponding to second link segments AC and BC).

FIG. 4A depicts an idealized segment of a scissor linkage. In this scenario, the centers of rotation at points A and point B may be the same for both the left and right sides of the linkage segment. FIG. 4B depicts a segment of a scissor linkage with joint clearance. If the side pivot joints A and B include clearance Ga, the joint clearance may increase the angle θ at point C to θ+δθ, and the distal pivot joint position C may fall down. As described above, a larger joint angle between link segments may make a scissor linkage more susceptible to singularities. As such, because joint clearance may result in larger joint angels between link segments, joint clearance may make a scissor linkage more susceptible to singularities.

FIG. 4C depicts a segment of a scissor linkage with adjusted link segment lengths to account for joint clearance. The second link segments AC and BC are lengthened to l+δl. In this way, the distal pivot joint C may be returned to its position in the idealized case, allowing the joint angle at point C to return to its idealized value of θ. The difference in length δl between the second link segments and the first link segments may be an amount greater than or equal to a clearance of the joints Ga. Whereas joint clearance may have the effect of incrementally increasing the angle between successive links at their intersection point (θ+δθ) at point C compared to θ at point O in FIG. 4B), the increased length of the distal link segments may have the effect of decreasing the angle between successive links. In this way, the extra length of link segments AC and BC may mitigate the effect of the joint clearance which can result in a singularity, enabling the actual scissor linkage to perform in a manner that may approach an idealized scissor linkage. As noted above, even a small joint clearance may have a large effect. In some embodiments, the second link segments are less than 1 mm longer than the first link segments.

Figure 4D:
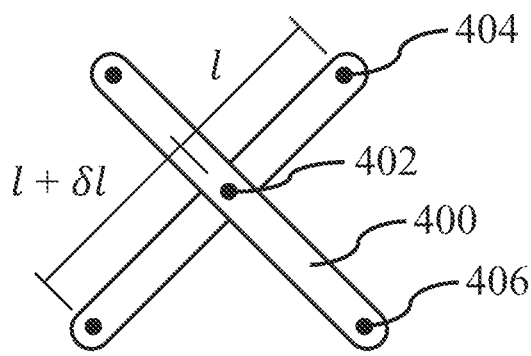
FIG. 4D depicts a unit of a scissor linkage with adjusted link segment lengths to account for joint clearance.

In FIGS. 4A-4C, only a single segment of a scissor linkage is considered. Of course, multiple segments may be connected together in series to form a full scissor linkage. The distal pivot joint of one segment may form the proximal pivot joint of an adjacent segment to form a scissor linkage. Additionally, each second link segment of a given segment may be rigidly coupled to one of the first link segments of an adjacent scissor linkage segment. That is, a single rigid link may be comprised of a second link segment of a proximal scissor linkage segment and a first link segment of a distal scissor linkage segment. Thus, another way of viewing the above disclosure is that a link unit formed by two intersecting links 400 in the shape of an X includes a rotatable pivot 402 located at a middle portion of the links where they intersect. A length between the proximal pivot joints 406 of the links to the middle pivot joint is longer than a length between the middle pivot joint and the distal pivot joints 404 of the links using the above noted lengths of $1+\delta1$ and 1 respectively, see FIG. 4D. Linkage units such as these may be arranged in series with the distal pivot joints connected of a proximally located linkage unit connected to the proximal pivot joints of the next distally located linkage unit to form a desired scissor linkage.

Figure 5:
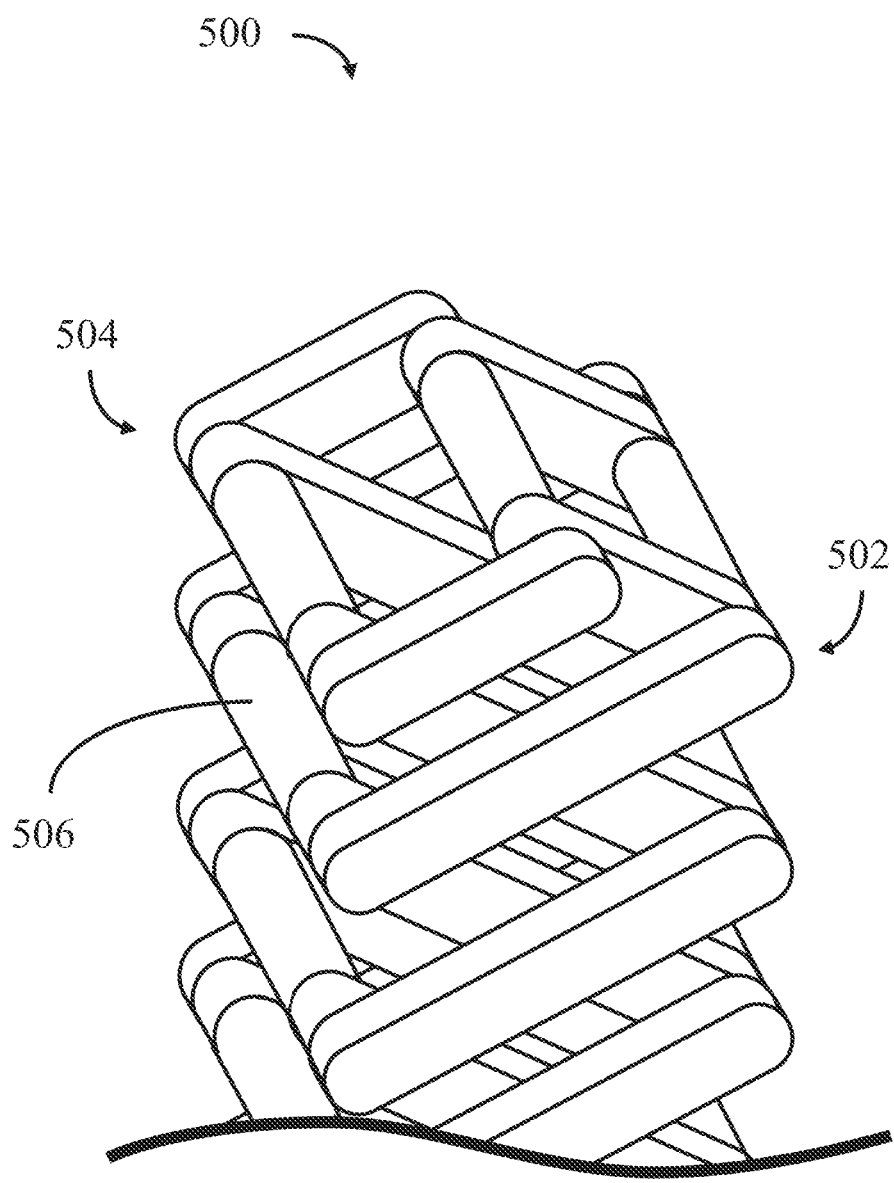
FIG. 5 is an isometric view of one embodiment of stacked scissor linkages.

FIG. 5 is an isometric view of one embodiment of a stacked scissor linkage. Scissor linkages may be stacked in parallel to provide increased stiffness and preventing sagging and/or deflection in certain directions. Additionally, scissor linkages may be stacked to enable multiple links of different functionality. For example, some links in a stacked scissor linkage may extend/retract the stacked scissor linkage, while other links in a stacked scissor linkage may transmit torques to a distal portion of the stacked scissor linkage.

In some embodiments of a stacked scissor linkage 500, a first scissor linkage 502 may be arranged in parallel with a second scissor linkage 504. The two scissor linkages may have two rotatable connections. The two rotatable connections may be configured to rotate about the same axis. For example, considering the single scissor linkage of FIGS. 1A-IC, a single scissor linkage 102 may rotate about rotatable connection 112, which may be a shaft. If scissor linkage 102 were part of a stacked scissor linkage, a second scissor linkage of the stacked scissor linkage may also rotate about the same shaft, although perhaps at a different axial position. In some embodiments, the two rotatable connections of the two scissor linkages of a stacked scissor linkage may not be directly connected. For example, each rotatable connection may be a separate output shaft of a motor, and the two motor shafts may be coaxial.

In some embodiments, it may be desirable to provide a reinforced robotic arm that is less prone to deflection during use. In such an embodiment, and as illustrated in the embodiment of FIG. 5, a robotic arm may include the first and second scissor linkages 502 and 504 in a stacked scissor linkage where the first and second scissor linkages are be coupled through one or more reinforcement members 506 extending between corresponding points of the scissor linkages. For example, reinforcement members may extend from each side pivot joint of the first scissor linkage to a corresponding side pivot joint of the second scissor linkage.

In some embodiments, reinforcement members may simply provide structural support. In some embodiments, reinforcement members may be used to enforce kinematic constraints. For example, a stacked scissor linkage may by controlled through manipulation of only one scissor linkage. In such cases, the reinforcement members may enforce kinematic constraints by transmitting forces and torques from the driving scissor linkage to the driven scissor linkage. Of course, instances in which you drive linkages are located in more than a single set of the system linkage are also contemplated. For example, a first driven proximal link may be associated with a first scissor linkage within the arm and a second driven proximal link may be associated with a separate second scissor linkage within the arm such that driving the separate first and second proximal links may control the overall operation of the robotic arm. It should be appreciated that a stacked scissor linkage may include any suitable number of scissor linkages arranged in parallel and the drive links may be associated with any one or more of those scissor linkages as the disclosure is not limited in this regard.

In some embodiments, scissor linkages may be arranged both in parallel and in series. For example, a first scissor linkage may be arranged in parallel with a second scissor linkage, forming a first stacked scissor linkage. A third scissor linkage may be arranged in parallel with a fourth scissor linkage, forming a second stacked scissor linkage. The first stacked scissor linkage may be arranged in series with the second stacked scissor linkage. Of course, additional scissor linkages may be arranged in parallel or in series, as the disclosure is not limited with regard to the number of scissor linkages arranged either in parallel or in series.

FIGS. 6A-8 relate to the use of torque transmissions within various links of a scissor linkage. As described above, a drive link may be used to apply torques to pivot joint of an adjacent link to selectively extend and/or retract the scissor linkage that contains that drive link. In contrast, a transmission link in a first scissor linkage may be used to transmit torques to a distal end of the first scissor linkage without applying torques to the pivot joints of the linkage to affect the joint angles of the first scissor linkage. Embodiments related to both of these types of linkages are described further below.

Figure 6A:
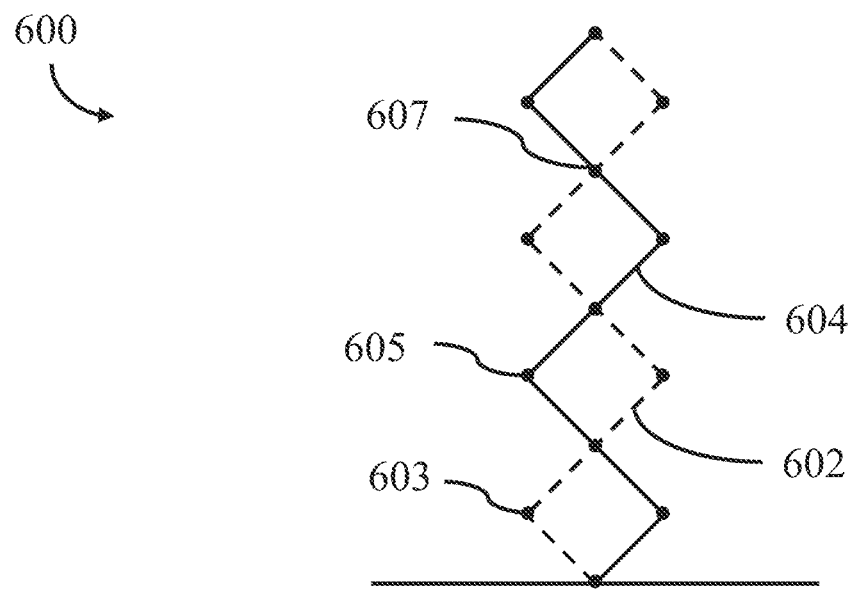
FIG. 6A is a schematic of a scissor linkage that includes drive links and transmission links.

FIG. 6A is a schematic of a scissor linkage 600 that includes drive links 602 and transmission links 604. The drive links may be pivotably connected to each other in series. Drive links 602 may be connected through drive link connections 603 corresponding to a first portion of the side pivot joints of the scissor linkage. Similarly, the transmission links may be pivotably connected to each other in series. Transmission links 604 may be connected through transmission link connections 605 corresponding to a second portion of the side pivot joints. The drive links and the transmission links may be pivotably connected at multiple locations to form the scissor linkage 600. Drive links 602 and transmission links 604 may be connected at connections 607 where they cross near the middle portion of the linkages. The connections 603, 605, and 607 may each enable relative rotational motions, and yet may be structurally dissimilar, as will be explained below.

Figure 6B:
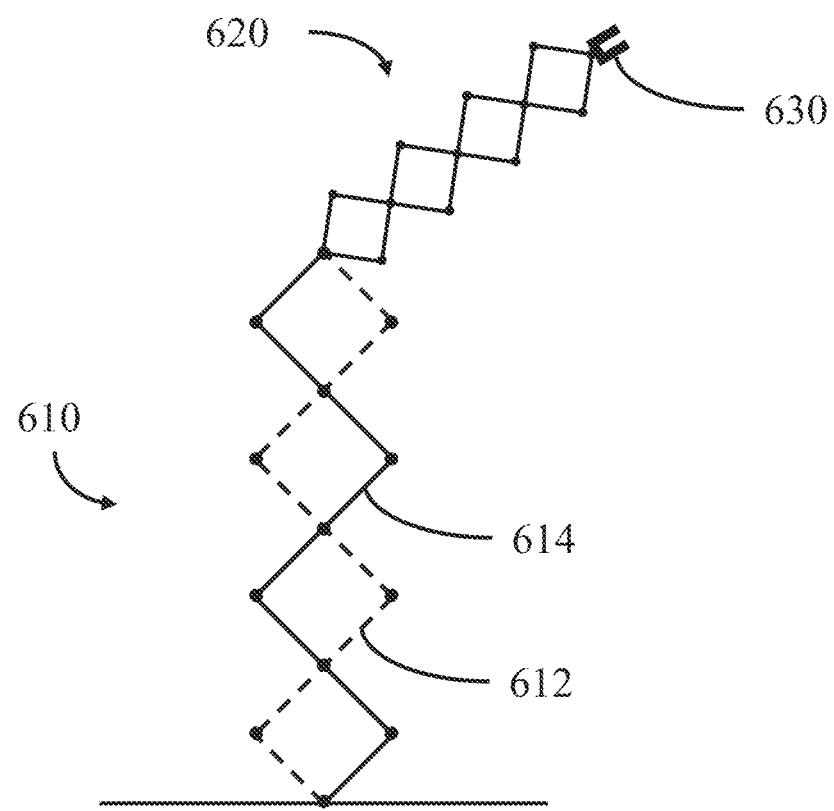
FIG. 6B is a schematic of serial scissor linkages in which the transmission links of the proximal scissor linkage transmits torque to the distal scissor linkage.

FIG. 6B is a schematic of serial connected scissor linkages in which the transmission links of the proximal scissor linkage transmit torques to the distal scissor linkage to selectively control motion of the second scissor linkage. In the embodiment of the figure, a first scissor linkage 610 includes drive links 612 and transmission links 614. A second scissor linkage 620 is serially connected to the first scissor linkage 610, and includes a distal end effector 630. Drive links 612 may be used to extend/retract the first scissor linkage 610. Transmission links 614 may be used to transmit a torque to the second scissor linkage 620 which may selectively extend and/or retract the second scissor linkage. For example, a first torque may be applied to the serial scissor linkages by a first motor associated with a proximal transmission link of the first scissor linkage 610. The serially connected transmission links 614 may transmit a torque through the first scissor linkage 610 to a distal portion of the first scissor linkage. The second scissor linkage 620 may be coupled to an output of the distal most transmission link of the first scissor linkage so that the torque may be an input of the second scissor linkage. The torque may cause the second scissor linkage to extend, retract, or rotate, or may be similarly transmitted through the second scissor linkage to control the end effector 630, for example.

If multiple parallel and interconnected scissor linkages are used, it may be possible to control the selective rotation, selective extension/retraction, and provide torque transmission to a distally located scissor linkages and/or components within a robotic arm using the above noted transmission and/or drive links. Thus robotic arms may include a plurality of scissor linkages arranged both in series and in parallel. For example, in some embodiments, a robotic limb may include a first scissor linkage and a second scissor linkage arranged in parallel, with a third scissor linkage arranged in series. The first and second scissor linkages may each include both drive links and transmission links. The drive links of the first and second scissor linkages may work cooperatively to extend and/or retract the first and second scissor linkages. The transmission links of the first and second scissor linkages may transmit first and second torques to the third scissor linkage. These two torques may be used to drive the two proximal links of the third scissor linkage, allowing the third scissor linkage to both extend/retract and rotate in a manner as described above.

Figure 7:
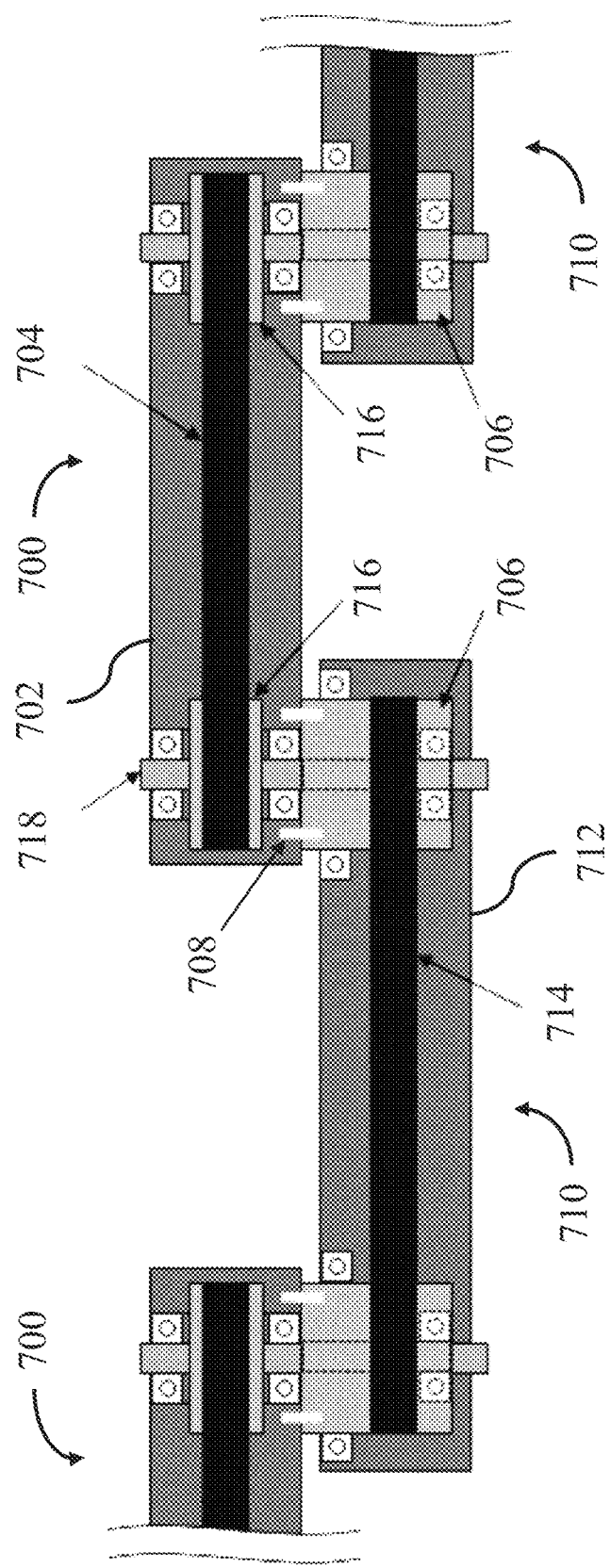
FIG. 7 depicts one embodiment of a series of connected drive links.

FIG. 7 depicts one embodiment of a series of connected drive links. In some embodiments, drive links may be one of two types. In embodiments of scissor linkages that include drive links, the two types of drive links may alternate. The first type of drive link 700 may include a body 702, a first set of pulleys 716 including two pulleys, or other transmission component, rotatably disposed on opposing sides of the body. A timing belt 704, or other transmission component such as a chain or gears, may be disposed within the body 702 and extend between, and be engaged with the first set of pulleys such that rotation of the first set of pulleys moves the timing belt. The first type of link may also include two shafts 718 supported by a rotatable connection, such as a set of roller bearings, in the link. The two separate pulleys are disposed on and attached to the separate shafts within the link such that the shafts and pulleys may be rotated within the first type of link. At least one end of the shafts may extend out from a side of the first type of link towards a connection with the second type of link. The second type of link may include a second set of pulleys 706 including two pulleys arranged on opposing end portions of the link. These pulleys of the second link may be rigidly coupled to the body 702 of adjacent links of the first type using one or more pins 708 and/or any other rigid connection such that rotation of the pulleys results in rotation of the associated first link and vice versa. The rotatable shafts of the first link may extend through the associated pulleys of two separate links of the second type such that the shafts extend through a through hole formed in the pulleys and are rigidly coupled to a body 712 of the associated second link. Accordingly, rotation of the shaft of a first link will result in rotation of the body of an attached second link. The second set of pulleys are rotatably supported within the body of the second type of link 710 using any appropriate rotatable support that permits the second set of pulleys to rotate relative to the body of the second type of link. As illustrated in the figures, the second set of pulleys 716 is disposed at least partially within the body of the second type of drive link 710 such that a second timing belt 714 extends between and is engaged with the two pulleys located on opposing end portions of the second type of drive link.

Using the above structure, or other similar construction, movement of a timing belt or other transmission component within a given drive link may apply a torque to and rotate an adjacent drive link, which may in turn cause movement of the timing belt within the adjacent drive link, causing an entire scissor linkage to extend or retract. For example, still referring to FIG. 7, as timing belt 714 of drive link 710 is advanced, pulley 706 is rotated. Because pulley 706 is rigidly coupled to drive link 700 by means of pins 708, rotation of pulley 706 by timing belt 714 rotates drive link 700. As drive link 700 rotates with respect to drive link 710, drive link 700 also rotates with respect to pulley 716, as pulley 716 is rigidly coupled to drive link 710 by the shaft 718. As drive link 700 rotates with respect to pulley 716, the timing belt 704 of the drive link 700 advances. Thus, the timing belt 704 maintains the angle between drive link 700 and the previous drive link 710 substantially the same as the angle between drive link 700 and the next drive link 710. As such, the angle between any two links within a scissor linkage may be constrained to be substantially the same. In this way, opening and closing torques may be applied directly to the individual pivot joints of a scissor linkage which may help to avoid singularities occurring during operation of a scissor linkage.

In the above embodiment, pulleys and belts have been described. However, systems using chains and sprockets, gears, linkages, and/or other appropriate transmission components capable of applying the desired motions to the links may be used. For example, chains and sprockets may be directly substituted for the pulleys and belts described above. With regards to gears, the pulleys may be replaced by gears and appropriate components such as worm gears, intermediate gears, or other structures may be used to drive the gears to provide the desired motion.

Figure 8:
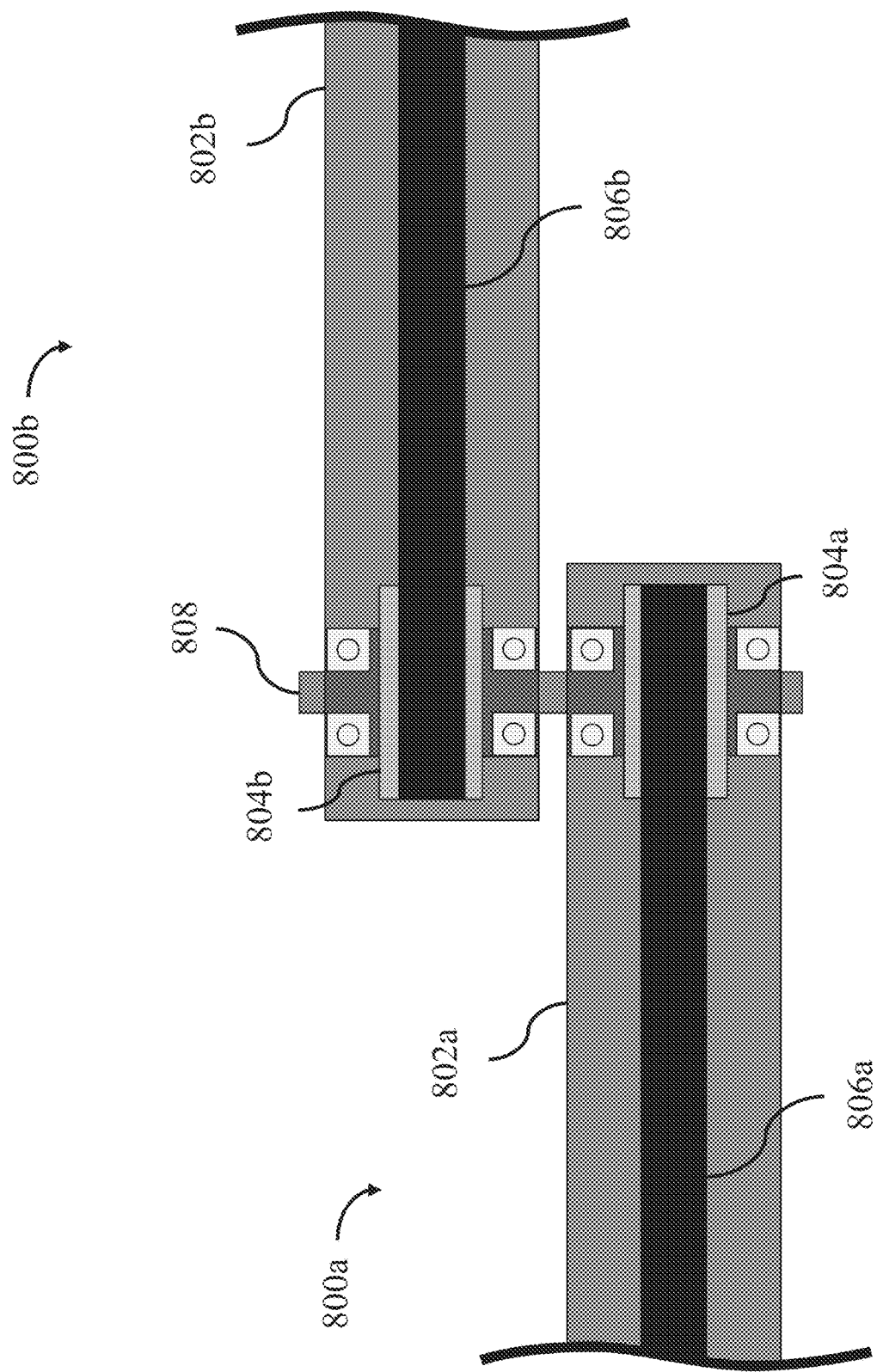
FIG. 8 depicts one embodiment of a series of connected transmission links.

FIG. 8 depicts one embodiment of a series of transmission links. In FIG. 8, a first transmission link 800*a* is coupled to a second transmission link 800*b*. Each transmission link may include an elongate body (e.g., body 802*a*, body 802*b*), two pulleys disposed on opposing end portions of the linkage, and a timing belt (e.g., timing belt 806*a*, timing belt 806*b*). In the depicted embodiment, the timing belt 806 may extend between and be engaged with the two pulleys of a given transmission link. A shaft 808 may couple and rotatably fix the rotation of a pulley 804*a* of the first transmission link 800*a* and a pulley 804*b* of the second transmission link 800*b* such that these pulleys rotate in sync with one another. The shaft 808 is rotatably supported by each associated link via any appropriate rotatable connection that permits the shaft to rotate freely relative to the associated links which permits free rotation of the links relative to each other. Movement of timing belt 806*a* of transmission link 800*a* may cause pulley 804*a* to rotate. The rotation of pulley 804*a* may induce rotation of pulley 804*b* of transmission link 800*b* via the shaft 808. As pulley 804*b* turns, timing belt 806*b* may move in response. In this way, a torque may be transmitted from one transmission link to another without applying a torque to the individual joints of the linkage and/or otherwise affecting the relative joint angle between the two transmission links. Such torque transmission may be continued through any suitable number of transmission links. Thus, in some embodiments, a shaft, or other structure, of a distal most transmission link may be used as an output to apply a torque to the input of a desired component. For example, as described above, the transmitted torque may be used to drive a link of an adjacent distally located scissor linkage.

In the embodiments of FIGS. 7 and 8, torque transmissions have been shown as belt and pulley mechanisms. However, it should be understood that this is by example only. Other torque transmissions may include a chain and sprocket, gears, linkages, or any other suitable mechanism for transmitting torque from one point to another, as the disclosure is not limited in this regard.

Example: Singularity Analysis

In this example, a singularity analysis of a 2-DOF scissor linkage is presented. First, it was expected that the cause of singularity was the initial angle of the base link, 170° as it was close to the angle of the theoretical singularity posture, 180°. To verify this, the necessary motor torque to extend the fully contracted scissor linkage was simulated.

Having no external load and only the weight of the links, the minimum torque to extend the linkage was 9.2 Nm. Having 9.8 N of external load, the torque to extend the linkage increased to 19 Nm. The continuous torque capability of motors used was 22 Nm, therefore, the motor torque should have been sufficient to extend the scissor linkage. Nevertheless, the scissor linkage could not be extended without exceeding the motors' current limits. As mentioned above, the linkage could not be extended upward because it "locked".

Next, the reason why the scissor linkage was unable to extend upward despite the motor torques being theoretically sufficient was considered. The hypothesis was that the clearance at each joint was the main cause of the singular posture. Therefore, the deformation of the scissor linkage was simulated, comparing the case of no clearance Ga=0 mm and the case of clearance Ga=0.05 mm at all joints, see FIGS. 4A-4B. In this simulation, the external force was set to 0 N.

With no clearance, the angle of the bottom links was 170° and the angle of the top links was 170.4°. The difference 0.4° was caused solely by deflection due to the weight of the links. As a result, there was no singularity, as nowhere was the angle sufficiently close to 180°. With clearance accounted for, the angle of bottom links was 1700 and the angle of the top links was 177.4°. Since the angle of the top links was sufficiently close to 180°, a singularity posture occurred at the top links. Additionally, in this case the scissor height was 54 mm shorter than in the no-clearance case. As a result, clearance in each joint appeared to be a cause of the singularity. In this case, the clearance Ga was only 50 micrometers, but had a large influence on the overall behavior. This effect may depend on the number of segments in the scissor linkage.

Example: Implementation in a Robot

The two above-mentioned strategies for singularity avoidance (adjusting link segment lengths and using torque transmissions in drive links) were applied to the first scissor linkage of a mobile robot arm that included two stacked scissor linkages in series (see FIG. 3). Although the value δl=0.05 mm was sufficient based on the estimation of clearance Ga (see above "Example: Singularity Analysis"), δl was set to 0.1 mm, as the resolution was limited by the 3D printer used to produce the links. The 3D printer was a Markforged 3D printer, with carbon fiber reinforcement. Although mechanical components such as pulleys and belts were added, the stiffness and weight of each link was the same as the original prototype of the 2-DOF scissor mechanism without the singularity avoidance strategies implemented.

As a result, the 2-DOF scissor mechanism was able to extend upward without experiencing a singularity. The linkages smoothly and stably elongated from a fully contracted condition. Consequently, the robot achieved over six times the extension rate as previously possible before the implementation of the singularity avoidance strategies. The robot with this mechanism could move under a standard desk and elongate upward to a height of 2.0 m. It achieved a rotational speed of 0.2 rad/s and an elongation speed of 0.7 m/s.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A robotic limb comprising:
   at least one scissor linkage comprising:
     a first proximal link; and
     a second proximal link;
   a first motor operatively coupled to the first proximal link to selectively rotate the first proximal link about a first axis; and
   a second motor operatively coupled to the second proximal link to selectively rotate the second proximal link about the first axis, wherein operating the first and second motors rotates the first and second proximal links, wherein relative rotation between the first proximal link and the second proximal link selectively controls extension and retraction of the at least one scissor linkage, wherein rotation of the first proximal link and the second proximal link selectively controls rotation of the at least one scissor linkage, wherein the rotation of the at least one scissor linkage is about the first axis, wherein the rotation of the at least one scissor linkage about the first axis rotates a distal portion of the robotic limb about the first axis, and wherein the first motor and the second motor are configured to control an angular position of the first proximal link and an angular position of the second proximal link independently from one another.

2. The robotic limb of claim 1, further comprising a mobile base, wherein the at least one scissor linkage is disposed on the mobile base.

3. The robotic limb of claim 1, wherein the at least one scissor linkage includes a first scissor linkage and a second scissor linkage arranged in parallel with the first scissor linkage.

4. The robotic limb of claim 3, wherein the first proximal link forms part of the first scissor linkage and the second proximal link forms part of the second scissor linkage.

5. The robotic limb of claim 3, further comprising reinforcement members extending between corresponding points of the first and second scissor linkages.

6. The robotic limb of claim 1, wherein the at least one scissor linkage includes a first scissor linkage and a second scissor linkage arranged in series with the first scissor linkage.

7. The robotic limb of claim 6, wherein the first scissor linkage includes the first and second proximal links, and wherein the second scissor linkage includes:
a third proximal link; and
a fourth proximal link;
wherein the robotic limb further comprises:
a third motor operatively coupled to the third proximal link to selectively rotate the third proximal link; and
a fourth motor operatively coupled to the fourth proximal link to selectively rotate the fourth proximal link, wherein operating the third and fourth motors rotates the third and fourth proximal links, wherein relative rotation between the third proximal link and the fourth proximal link selectively controls extension and retraction of the second scissor linkage, and wherein rotation of the third proximal link and the fourth proximal link selectively controls rotation of the second scissor linkage.

8. The robotic limb of claim 7, wherein torques from the third and fourth motors are transmitted to the third and fourth proximal links through the first scissor linkage.

9. The robotic limb of claim 1, wherein the at least one scissor linkage comprises a first scissor linkage, wherein the first proximal link forms part of the first scissor linkage, and wherein the second proximal link forms part of the first scissor linkage.

10. A robotic limb comprising:
a first scissor linkage comprising:
a plurality of transmission links, wherein the plurality of transmission links are pivotably connected to each other in series, wherein the plurality of transmission links includes a first proximal link and a distal link; and
a second plurality of links, wherein the second plurality of links are pivotably connected to each other in series, wherein the second plurality of links includes a second proximal link,
wherein the first proximal link is configured to rotate about a first axis, wherein the second proximal link is configured to rotate about the first axis, wherein relative rotation between the first proximal link and the second proximal link selectively controls extension and retraction of the first scissor linkage, wherein rotation of the first proximal link and the second proximal link selectively controls rotation of the first scissor linkage, wherein the rotation of the first scissor linkage is about the first axis, wherein the plurality of transmission links and the second plurality of links are pivotably connected in a plurality of locations to form the first scissor linkage, wherein the plurality of transmission links are constructed to transmit a first torque from the first proximal link to an output of the distal link, and wherein the first torque transmitted from the first proximal link to the output of the distal link is separate from a second torque applied to the first proximal link to extend the first scissor linkage.

11. The robotic limb of claim 10, wherein each link of the plurality of transmission links includes two opposing first pulleys located on opposing end portions of the link and a timing belt extending between and engaged with the first pulleys.

12. The robotic limb of claim 11, further comprising first and second shafts, wherein the first and second shafts are rotatably fixed to one of the first pulleys in the link and a separate first pulley located in an adjacent link, and wherein the link is rotatable relative to the first and second shafts.

13. The robotic limb of claim 10, wherein the rotation of the first scissor linkage about the first axis rotates a distal portion of the robotic limb about the first axis.

\* \* \* \* \*